Dec. 26, 1922.
R. G. BEECHLER.
STEERING GEAR CONNECTION.
FILED DEC. 27, 1920.
1,439,788
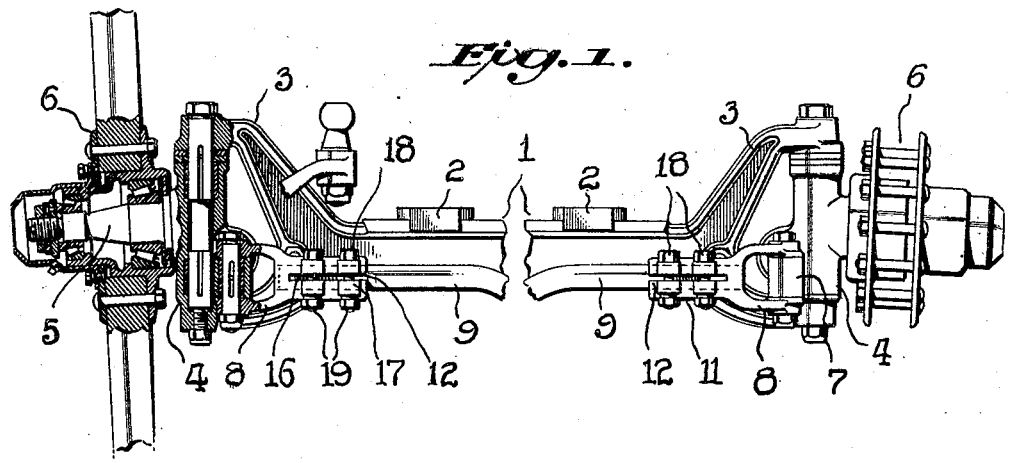
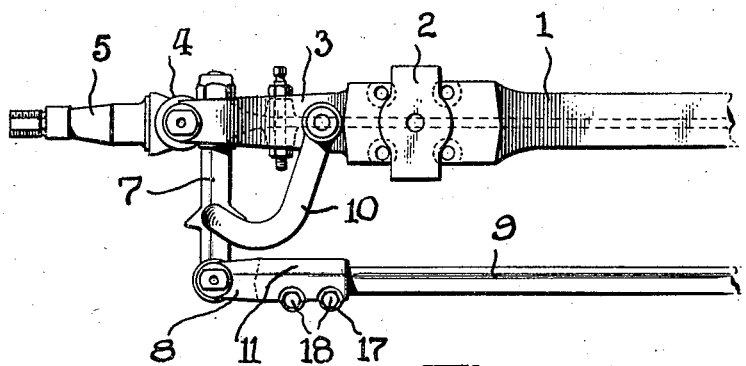
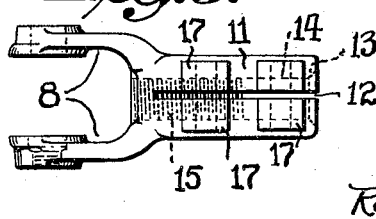
INVENTOR
Roy G. Beechler,
BY
ATTORNEYS Patented Dec. 26, 1922.

1,439,788

UNITED STATES PATENT OFFICE.

ROY G. BEECHLER, OF DETROIT, MICHIGAN, ASSIGNOR TO VULCAN MOTOR AXLE CORPORATION, OF DETROIT, MICHIGAN, A CORPORATION OF VIRGINIA.

STEERING-GEAR CONNECTION.

Application filed December 27, 1920. Serial No. 433,532.

*To all whom it may concern:*

Be it known that I, ROY G. BEECHLER, a citizen of the United States of America, residing at Detroit, in the county of Wayne and State of Michigan, have invented certain new and useful Improvements in Steering-Gear Connections, of which the following is a specification, reference being had therein to the accompanying drawings.

The front axle assembly of motor operated vehicles includes, among other things, yokes and a cross member connecting the yokes, and this invention relates particularly to the connection between a yoke and its cross member.

The object of my invention is to provide an adjustable clamp connecting member by which a cross member may be adjustably connected to a yoke to insure proper co-operation, and then fixed so that the adjustment cannot vary during such cooperation, thus providing a positive and reliable connection, which while included in the front axle assembly may also be known as part of the steering gear mechanism.

Other objects or advantages of my invention will appear when following the description of the drawing, wherein Figure 1 is an elevation of a front axle assembly, partly broken away and partly in section;

Fig. 2 is a plan of a portion of the same, and

Fig. 3 is an elevation of a yoke clamp connecting member.

In the drawing the reference numeral 1 denotes a conventional form of axle having spring perches 2 and forks 3. Swiveled in the forks 3 are knuckles 4 having spindles 5 for wheel hubs 6, and connected to the knuckles 4 are arms 7 provided with pivoted yokes 8 connected by a cross tube or member 9. Either one of the arms 7 has a crank portion 10 by which the knuckles 4 may be simultaneously adjusted by a suitable steering mechanism (not shown).

As pointed out in the beginning my invention resides in the connection between the arm yokes 8 and the cross member 9 and since the connections are identical at the ends of the cross member 9, I deem it only necessary to consider the detail construction of one of the connections.

The yoke 8 has a tubular socket or sleeve portion 11 open at both ends thereof and one side of the tubular socket is provided with a longitudinal slit or slot 12 extending from the inner end of the socket to a point in proximity to the outer end thereof, said slit or slot dividing the socket to that extent as to provide contractible halves which may be contracted about the end of the connecting member 9.

The bore of the tubular socket 11 has its inner end flared, as at 13, and left smooth, as at 14, while the outer end of the bore is provided with screw threads 15. The flared and smooth end of the bore permits of the end of the connecting member 9 readily entering the tubular socket, and the extreme end portion of the connecting member 9 is screwthreaded, as at 16 so that it may be placed in screwthreaded engagement with the screw threads 15 of the tubular socket. With the connecting member 9 in screwthreaded engagement with the socket, it is possible to adjust the member so that the yokes 8 are properly articulated to operate the knuckles 4 in synchronism.

In order that the tubular socket 11 may be locked relative to the connecting member 9, the slitted or slotted side of the socket has opposed apertured ears or lugs 17 adapted to be connected by bolts 18 and nuts 19, said bolts and nuts contracting the socket about the connecting member 9 until the contractible portions of the socket clamp the smooth portions thereof on the smooth portion of the connecting member 9. The inner end of the socket being smooth and the connecting member having perfect fit therein eliminates the faults commonly found in other types of adjustment due to the sharp edges of threading at the juncture of the socket with the cross member, and in my construction the threads are simply depended upon for adjustment while the actual connection is established by the clamping action of the socket on the connecting member. Of course the clamping action of the socket extends to the screw threads thereof, particularly intermediate the ends of the socket where the threads will be bound without injury to the same. If the threads extended to the inner end of the socket there would be some liability of the same being mutilated and this is especially true of any threads exposed at the inner end of the socket. It is obvious that mutilated threads would interefere with adjustments of the connecting member.

From the foregoing it will be observed that the socket is characterized by only a portion thereof being threaded so that the remaining portion may have a clamping action, and I do not care to confine my invention to the precise construction of the yoke so long as it includes a socket in accordance with this invention.

What I claim is:—

Means for connecting a yoke and member comprising a socket carried by the yoke, and having a bore with one portion thereof threaded and the remaining portion thereof smooth so as to receive corresponding portions of the member, said socket having a wall thereof provided with a slot extending from the open end of said socket to a point in proximity to said yoke, opposed sets of lugs at the side walls of the socket slot with one set of lugs intermediate the threaded portion of the socket bore and the other set of lugs intermediate the smooth portion of the bore, and bolts and nuts connecting each set of lugs.

In testimony whereof I affix my signature in presence of two witnesses.

ROY G. BEECHLER.

Witnesses:
ANNA M. DORR,
KARL H. BUTLER.